United States Patent [19]

Horne

[11] Patent Number: 4,887,296

[45] Date of Patent: Dec. 12, 1989

[54] CRYPTOGRAPHIC SYSTEM FOR DIRECT BROADCAST SATELLITE SYSTEM

[75] Inventor: Donald R. Horne, Don Mills, Canada

[73] Assignee: Ricoh Co., Ltd., Tokyo, Japan

[21] Appl. No.: 113,333

[22] Filed: Oct. 16, 1987

Related U.S. Application Data

[63] Continuation of Ser. No. 665,114, Oct. 26, 1984, abandoned.

[51] Int. Cl.[4] ............................................. H04L 9/02
[52] U.S. Cl. ...................................... 380/21; 380/20; 380/44; 380/47
[58] Field of Search ...................... 380/10, 20, 21, 28, 380/23, 25, 43–47

[56] References Cited

U.S. PATENT DOCUMENTS

| | | | |
|---|---|---|---|
| 4,227,253 | 10/1980 | Ehrson et al. | 375/2.1 |
| 4,365,110 | 12/1982 | Lee et al. | 178/22.09 |
| 4,484,027 | 11/1984 | Lee et al. | 178/22.16 |
| 4,528,588 | 7/1985 | Löfberg | 358/122 |
| 4,531,020 | 7/1985 | Wechselberger et al. | 358/123 |
| 4,531,021 | 7/1985 | Bluestein et al. | 358/123 |
| 4,535,355 | 8/1985 | Arn et al. | 178/22.17 |
| 4,605,820 | 8/1986 | Campbell, Jr. | 380/23 |
| 4,613,901 | 9/1986 | Gilhouser et al. | 178/22.16 |
| 4,634,808 | 1/1987 | Moerder | 380/45 |
| 4,661,658 | 4/1987 | Matyas | 380/23 |
| 4,685,131 | 8/1987 | Horne | 380/20 |
| 4,694,491 | 9/1987 | Horne et al. | 380/20 |
| 4,731,840 | 3/1988 | Mniszewski et al. | 380/21 |
| 4,731,842 | 3/1988 | Smith | 380/21 |
| 4,771,459 | 9/1988 | Jansen | 380/21 |
| 4,803,725 | 2/1989 | Horne et al. | 380/44 |

Primary Examiner—Salvatore Cangialosi
Attorney, Agent, or Firm—Cooper & Dunham

[57] ABSTRACT

A three key cryptographic system is used in the transmission of digitized signals to a plurality of receivers, each having a unique address number and a factory stored signature key which is a function of the address number. At the transmission end, a common key is generated and used to encrypt the signals to be transmitted. The signature key is generated for each receiver unit by encrypting the address number of the unit using a secret master key. The common key is then encrypted for use by each receiver using the generated signature key for that receiver. A data stream is inserted into the horizontal blanking intervals of the composite video signal. The data stream includes the encrypted signals receivable by all receivers and addressed portions, each receivable by a different receiver, containing the encrypted common key for that receiver. The receiver decrypts the common key with the stored signature key and uses it to decrypt the signals. Only a single master key must be stored and protected.

31 Claims, 4 Drawing Sheets

CRYPTOGRAPHIC SYSTEM FOR DIRECT BROADCAST SATELLITE SYSTEM

This is a continuation of co-pending application Ser. No. 665,114, filed on Oct. 26, 1984, now abandoned.

The present invention relates to cryptographic systems and, more particularly, to a cryptographic system for use in a direct broadcast satellite communication network to permit the reliable, secure transmission of audio and control signals.

The availability of small, low-cost television receive-only terminals in recent years has resulted in an increasing demand for direct broadcast satellite services. Such services include Pay TV, tele-conferencing, tele-seminar, private broadcast networks, and the like. Moreover, as receive only television antenna technology improves and the cost of television receive-only terminals decreases, the demand for direct broadcast satellite services is expected to increase.

Unlike land lines and terrestrial microwave links, satellite transmissions lack privacy. Such transmissions can be received by any TV receive-only terminal whose antenna is situated to receive the satellite signals. Accordingly, the secure transmission of video and audio programming and data signals is required to provide the privacy essential to many applications.

A simple example of a direct broadcast satellite network in which security is required is one which broadcasts television signals to paying subscribers. Since any receiver having an antenna in the broadcast signal area can receive the satellite signals, it is necessary that the signals be encoded in a way which can be decoded only by subscribers' receivers. Certain subscribers may have paid for certain programs or program groups, whereas others may have paid for other programs or program groups. The signals must then be further encoded such that subscribers who have paid for particular programs or groups of programs can receive same, while other subscribers cannot.

In addition, it may be desirable to design the system such that a particular subscriber can preview a program and then decide whether he/she wishes to watch the program and, hence, pay for the privilege. In such an impulse pay-per-view system, the decision of the subscriber must be recorded and communicated to a billing facility for appropriate billing. In such instances, the control signals to the subscriber's receiver instructing the receiver how to communicate with the billing office must be secure in order to eliminate the possibilities for theft of the service.

In the direct broadcast satellite service in which the cryptographic system of the present invention is used, the video signals are processed and transmitted in analog form. Audio signals are digitized and transmitted in digital data form. Addressable control data is organized into packets according to address and transmitted in the same digital form as the audio signals. All of the signals are combined in baseband using time-division-multiplex techniques. The combined baseband signal is then transmitted over the satellite link to subscribers' receivers using FM modulation.

In general, the transmission end equipment consists of a program processing unit and a real time controller. The program processing unit performs video signal processing and scrambling, audio digitization, encryption of the audio data, and baseband signals time multiplexing. The real time controller generates the audio cryptographic keys, encrypts the addressable control messages, generates the packet messages in accordance with the transmission protocol, maintains the user data base and communicates with other processing units.

The receiving end equipment includes an addressable controller decoder designed for use with a receiver which has the necessary interface for interaction with the decoder. The addressable controller-decoder demultiplexes the baseband signal, controls the terminal, descrambles the video signal, decrypts the audio data, and converts the audio data into analog form.

The baseband signal utilizes a composite video signal format which includes active video portions and horizontal blanking interval portions. The two audio channels and control data channel occupy a portion of the horizontal blanking intervals. The video frame synchronization information and the zero level reference are transmitted during the vertical blanking interval. The audio data and the control data are transmitted in a burst, synchronous mode. The data is non-returnable to zero binary encoded.

A two-level video scrambling screen is used. The first level is achieved by removing the line and frame synchronization pulses completely from the video signal. A unique sync word is transmitted in the vertical blanking interval for synchronization purposes. The addressable controller-decoder establishes synchronization by searching and locating the sync word. Once the sync word is located, all the sync pulses are reconstructed with reference to the sync word. This technique is used in conjunction with video signal inversion, which is the second security level. The sequence of video inversion is controlled by a binary bit stream at the transmitting end. The same bit stream is used to recover the inverted signal at the receiving end.

Unlike video scrambling, a highly secure audio encryption system can be achieved relatively inexpensively. The decryption circuit, being totally digital, can be implemented using semi-custom or custom integrated circuits. It is highly important that the encryption system employed achieve zero transmission error propagation, that is, one bit in error in the encrypted bit stream results in only one bit in error in the decrypted bit stream.

The system uses an encryption scheme in which the clear audio bit stream is combined with the bit stream generated by a stream cipher using an exclusive OR operation. The receiving end decrypts the audio bit stream using the same stream cipher bit stream. The stream cipher bit stream is generated by a secret key and an initializing vector. The algorithm for generating the bit stream is secret. The secret key is used for the duration of the communication session and is transmitted in encrypted form through the control data channel. The initializing vector is used for the duration of each NTSC frame and is transmitted in the clear form in the horizontal blanking interval. Extremely low error rate for the initializing vector is achieved by transmitting each bit many times.

The addressable control data channel carries alot of sensitive information such as audio decryption keys and authorization tier levels. The present system is designed to prevent an eavesdropper from receiving the correct information and to prevent a legitimate terminal from receiving more information than is authorized. The encryption system utilized in the present invention uses the concept of different terminal keys. A different key is used for the encrypted transmission to each receiver terminal. In this way, even in the unlikely event that a terminal key is compromised, damage can be stopped quickly by deleting the key.

The addressable control data are organized into blocks of 128 bits and encrypted using a secret block cipher. The length of the terminal key is 64 bits. When compared with the conventional Data Encryption System algorithm, the present block cipher has a larger block and a longer key. Accordingly, brute force attacks on the cipher will take considerably more effort.

The details of the direct broadcast satellite network in which the cryptographic system of the present invention is used, including an explanation of the transmission end equipment, the functioning of the terminal end equipment and the signal transmission system employed for communications between the two are set forth in co-pending U.S. patent application Ser. No. 548,357 filed Nov. 3, 1983 in the names of Ashok George and John Jeffers, entitled "Receiver With Interface For Interaction With Controller-Decoder" and U.S. patent application Ser. No. 729,290 filed May 1, 1985 entitled "Direct Broadcast Satellite Signal Transmission System" filed in the names of Joseph Glaab, Donald Horne, John Jeffers, and Wayne Mundy. In addition, an explanation of certain refinements to the cryptographic system of the present invention can be obtained from copending U.S. patent application Ser. No. 710,385 filed Mar. 11, 1985 and entitled "Cryptographic System Using Dual Key Sections And Selectable Key Fragments" by Donald Horne and John Jeffers. All of the above applications are assigned to the assignee herein.

It is, therefore, a prime object of the present invention to provide a cryptographic system for the reliable secure transmission of audio and control signals in a direct broadcast satellite network.

It is another object of the present invention to provide a cryptographic system for use in a direct broadcast satellite network for the transmission of information to a large number of different receivers wherein the necessity for storing and protecting a secret key for each receiver is eliminated.

It is another object of the present invention to provide a cryptographic system for use in a direct broadcast satellite network including a large number of receivers wherein only a single master key need be stored and protected at the transmission end.

It is another object of the present invention to provide a cryptographic system for use in a direct broadcast satellite network wherein the complexity of the system is contained in the transmission end and the various receivers are relatively simple and can be manufactured inexpensively.

In accordance with one aspect of the present invention, a cryptographic system for the secure distribution of information from a transmission node to first and second receiver nodes is provided. Each of the receiver nodes has a unique address number. Means are provided for generating a common key. Means are provided for encrypting the information to be distributed using the common key. Means are provided for generating a different individual key for each receiver node. The individual key generating means comprises a master key and means for encrypting the address number for each receiver node using the master key. Means are provided for forming an individualized encrypted common key for each receiver node by encrypting the common key using the generated individual key for that receiver node. Means are provided for distributing the encrypted information to both receiver nodes and the individualized encrypted common key for each receiver node to that receiver node.

The address number encrypting means preferably employs the Data Encryption Standard algorithm. The common key encrypting means preferably employs a block cipher algorithm.

The means for forming individualized encrypted common keys comprises means for selecting each receiver node in sequence and for generating the individual key for the selected receiver node. Means are provided for generating the individualized encrypted common key for the selected receiver node using the generated individual key for that selected receiver node.

The distributing means comprises means for generating a data stream. The data stream includes the encrypted information and addressed portions. Each of the addressed portions comprises the address number and the individualized encrypted common key for an addressed receiver node.

The information to be communicated comprises a digitized audio signal. This information is distributed through the use of a composite television signal including video signal portions and horizontal blanking intervals. The data stream is preferably inserted into the horizontal blanking intervals of the composite television signal.

Each receiver node has a unique individual key stored therein. Each receiver node comprises means for receiving the encrypted information, means for receiving the individualized encrypted common key for that receiver node, and means for decrypting the received individual encrypted common key using the stored individual key. Means are also provided for decrypting the received encrypted information using the decrypted common key.

The common key decrypting means preferably employs a block cipher algorithm. The information encrypting means and decrypting means preferably each employ a stream cipher algorithm.

Preferably, means are provided at the transmission end for periodically changing the common key. Such changes may take place on a program-to-program basis or at prescribed time intervals.

According to another aspect of the present invention, a three key cryptographic system for the secure distribution of information from a transmission node to a plurality of receiver nodes is provided. In the system, a first key is known only to the transmission node. Each receiver node has a unique address number and a prestored second key therein. The transmission node comprises means for generating the second key for a selected receiver node by encrypting the address number for the selected node with the first key. Means are provided for generating a third key. Means are provided for encrypting the information to be distributed with the third key. Means are provided for encrypting the third key for use by the selected receiver node with the generated second key. Means are provided for distributing the encrypted information to all of the receiver nodes and means are provided for distributing the encrypted third key for a selected receiver node to the selected receiver node.

Each of the receiver nodes comprises means for receiving the encrypted information and means for receiving the third key for that receiver node. Means are provided for decrypting the received encrypted third key with the stored second key. Means are also provided for decrypting the received encrypted information with the decrypted third key.

The second key generating means preferably employs a data encryption standard algorithm. The third key encrypting means preferably employs a block cipher algorithm. The third key decryption means also employs a block cipher algorithm.

Preferably, the third key generating means comprises means for periodically changing the third key. The information encryption means and information decrypting means each employ a stream cipher algorithm.

The stored second key is unique for each receiver node. The stored receiver key for each receiver node is a function of the address number of that receiver node.

In accordance with another aspect of the present invention, a three key cryptographic method for the secure information distribution from a transmission node to a plurality of receiver nodes is provided. A first key is known only to the transmission node. Each receiver node has a unique address number and a pre-stored second key which is a function of its address number. The method comprises the steps of generating the second key for a selected receiver by encrypting the address number for the selected unit with the first key. A third key is generated. The information to be distributed is encrypted by the third key. The third key is then encrypted with the generated second key. The encrypted information is distributed to all of the receiver nodes. The encrypted third key is distributed to the selected receiver node. The distributed encrypted information and the encrypted third key are received at the selected receiver node. The received encrypted information is decrypted using the received encrypted third key and the stored second key for the selected receiver node.

The step of decrypting the received encrypted information preferably comprises the steps of decrypting the encrypted third key using the stored second key for the selected receiver node and decrypting the encrypted information using the encrypted third key.

The step of generating the second key preferably comprises the step of encrypting the address number for the selected receiver node with the first key through the data encryption standard algorithm.

The step of encrypting the third key preferably comprises the step of encrypting the third key with the second key through a block cipher algorithm.

The step of encrypting the information preferably comprises the step of encrypting the information with the third key through a stream cipher algorithm.

The step of decrypting the third key comprises the step of decrypting the third key by the stored second key for the selected receiver node through a block cipher algorithm.

The step of decrypting the information preferably comprises the step of decrypting the information with the decrypted third key through a stream cipher algorithm.

In accordance with another aspect of the present invention, apparatus for encrypting digitizd signals in a direct broadcast satellite communications system is provided. The system includes a transmission node and a plurality of receiver nodes. Each receiver node has an address number and a prestored signature key which is a function of its address number. The apparatus comprises means for generating a common key and means for encrypting the digitized signals with the common key. Means are provided for generating the signature key for a selected unit. The signature key generating means comprises a master key and means for encrypting the address number of the selected receiver node using the master key. Means are provided for encrypting the common key for use by the selected receiver node using the generated signature key for that receiver node. Means are provided for distributing the encrypted digitized signals and the encrypted common key for the selected receiver node to the selected receiver node by means of a data stream. The data stream comprises a first portion containing the encrypted digitized signals and receivable by all receiver nodes and a second portion comprising a plurality of addressed portions. Each of the addressed portions comprises the encrypted common key for the addressed receiver node and is receivable only by the receiver node having the address number upon which the encrypted common key therein is based.

To these and to such other objects which may hereinafter appear, the present invention relates to a cryptographic system for use in a direct broadcast satellite network, as set forth in detail in the following specification and recited in the annexed claims, taken together with the accompanying drawings, wherein like numerals refer to like parts, and in which:

In general, the cryptographic system of the present invention is designed for use in a pay television distribution network and employs three keys to provide security against unauthorized program viewing. First, a master factory key is arbitrarily chosen as a system constant. Second, the master factory key is used in conjunction with an individual subscriber unit address to produce a second key, called a subscriber unit signature key, unique to each subscriber.

A third key, the common audio decryption key, is arbitrarily chosen to encrypt the audio signal at the transmission end. The third key is distributed to each authorized subscriber through the use of the first and second keys.

At the factory, the subscriber unit signature key is pre-loaded into a memory in a specific subscriber receiver unit. To distribute the common audio key, it is encrypted using the subscriber unit signature key as the key input of a unique block cipher algorithm. The resulting encrypted common audio key is delivered to the specific subscriber by an addressed packet in an addressable data stream.

At the specific subscriber receiver unit, the received encrypted common audio key is decrypted using the unique block cipher algorithm which employs the factory pre-loaded subscriber unit signature key as the decryption key. The resulting common decryption key is then used to decrypt the audio signal.

The integrity of the three key system depends on the effectiveness of the security measures employed to keep the master factory key safe from independent discovery or unauthorized use. In contrast to this, prior art systems of this type require that a unique key for each subscriber unit be protected at the transmission end. The present invention provides comparable security, but eliminates the necessity for protecting a separate key for each subscriber unit. In the present system, only a single key, the master factory key, need be protected at the transmission end.

Since the direct broadcast satellite network in which the cryptographic system of the present invention is employed is designed to accommodate 2-3 million different subscriber receiver units, the necessity of previous cryptographic systems for protecting the different key for each subscriber unit is quite burdensome. The three key cryptographic system of the present invention eliminates this problem entirely as it requires only a single master factory key be protected.

Figure 1:
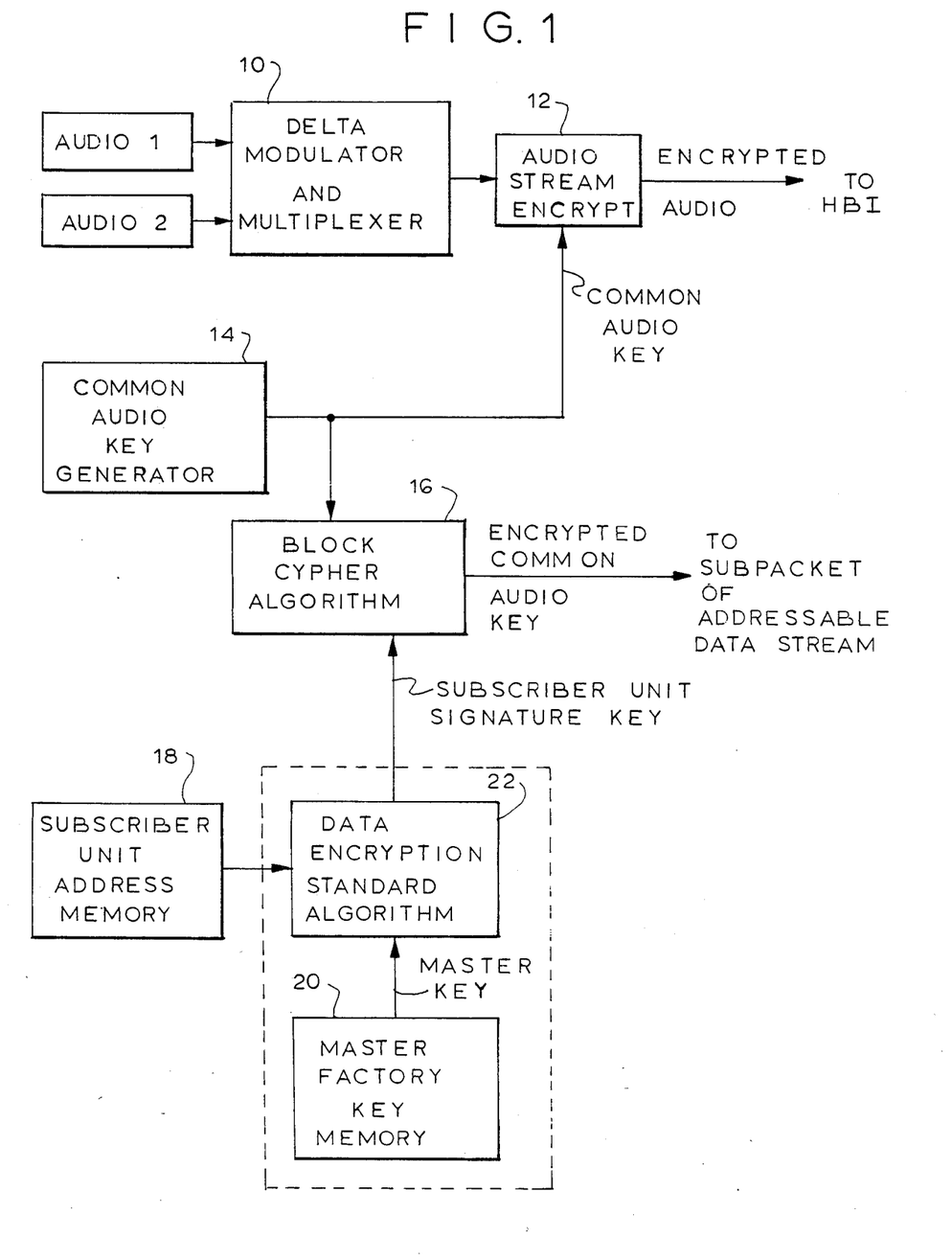
FIG. 1 is a schematic representation of the encryption system at the transmission end of the network.
Figure 4:
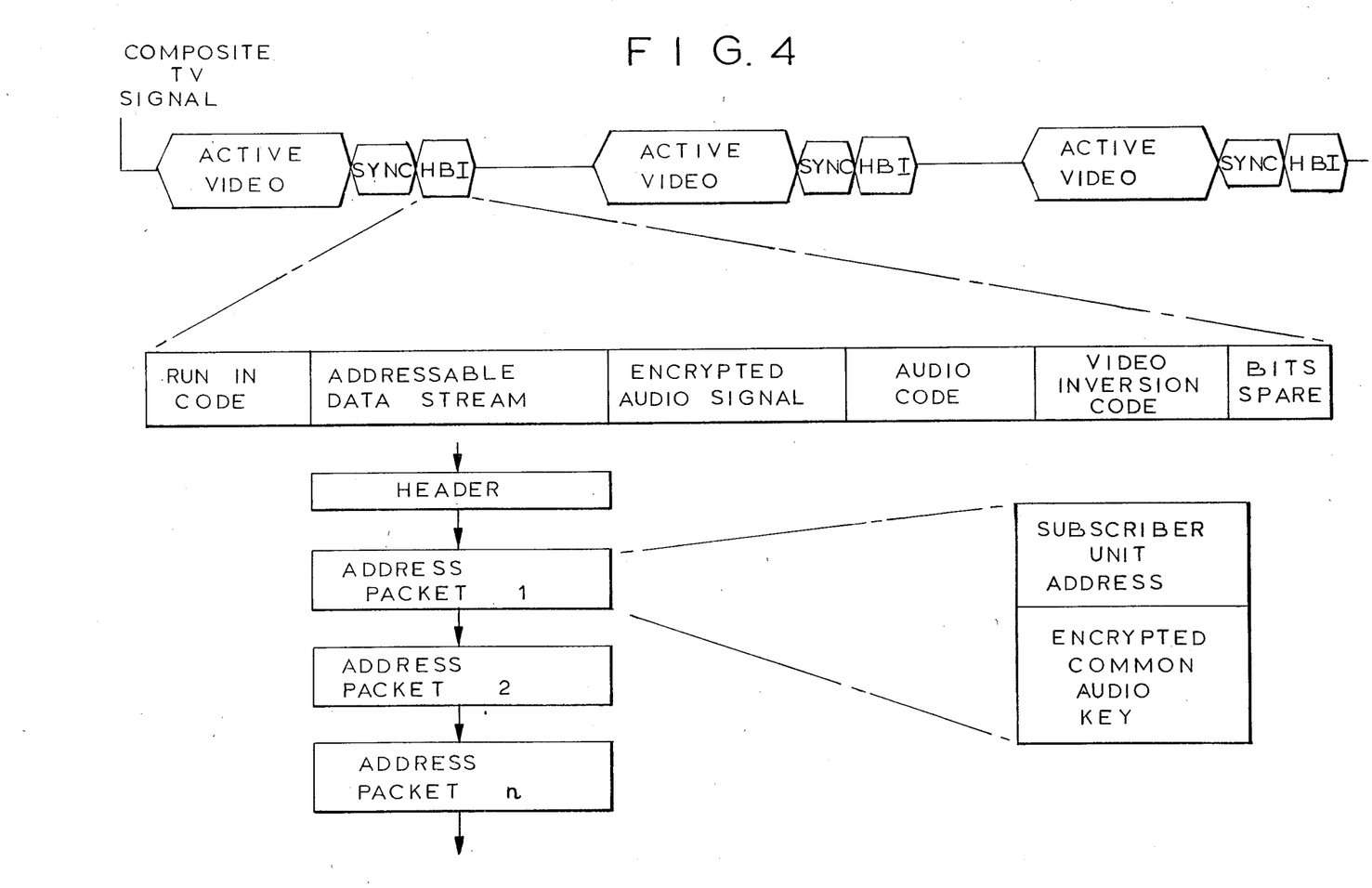
FIG. 4 is a schematic representation of the composite video signal over which the encrypted signals and key information is transmitted.

As seen in FIG. 1, the audio channel inputs AUDIO 1 and AUDIO 2 form the inputs to a delta modulator and multiplexer 10 of conventional design. The digitized output from modulator 10 is encrypted in an audio stream encryption circuit 12. The output of encryption circuit 12 is the encrypted audio signal which forms a portion of a data stream. The data stream illustrated in FIG. 4 is inserted into the horizontal blanking intervals of the composite television signal which is transmitted via satellite from the transmission end to each of the subscriber receiver units.

The digitized audio signal is encrypted using a common audio key generated by a common audio key generation circuit 14. The common audio key generating circuit 14 has capability for changing the common audio key periodically, either on a program-by-program basis or on a time basis such as hourly, daily, etc.

The common audio key is transmitted in encrypted form to each subscriber unit. The encrypted common audio key is individualized for each unit. Each of the individualized encrypted common audio keys, one of which is present for each subscriber receiver unit, is placed in a different addressed portion of the data stream. These portions of the data stream can be received only by the particular subscriber unit for which the individualized encrypted common audio key is intended.

Each individualized encrypted common audio key is generated through the use of a subscriber unit signature key. The subscriber unit signature key is unique to a particular unit. Each individualized encrypted common audio key is generated by encrypting the common audio key using the unique subscriber unit signature key in a block cipher algorithm circuit 16.

Each unique subscriber unit signature key is based on the subscriber unit address number for the subscriber unit to which the portion of the data stream including the individualized encrypted common audio key %s addressed. More specifically, each unique subscriber unit signature key is derived by encrypting the subscriber unit address number, stored in a memory 18, using the master factory key, stored in a master factory key memory 20, in an encryption circuit 22 which employs the Data Encryption Standard algorithm.

Figure 2:
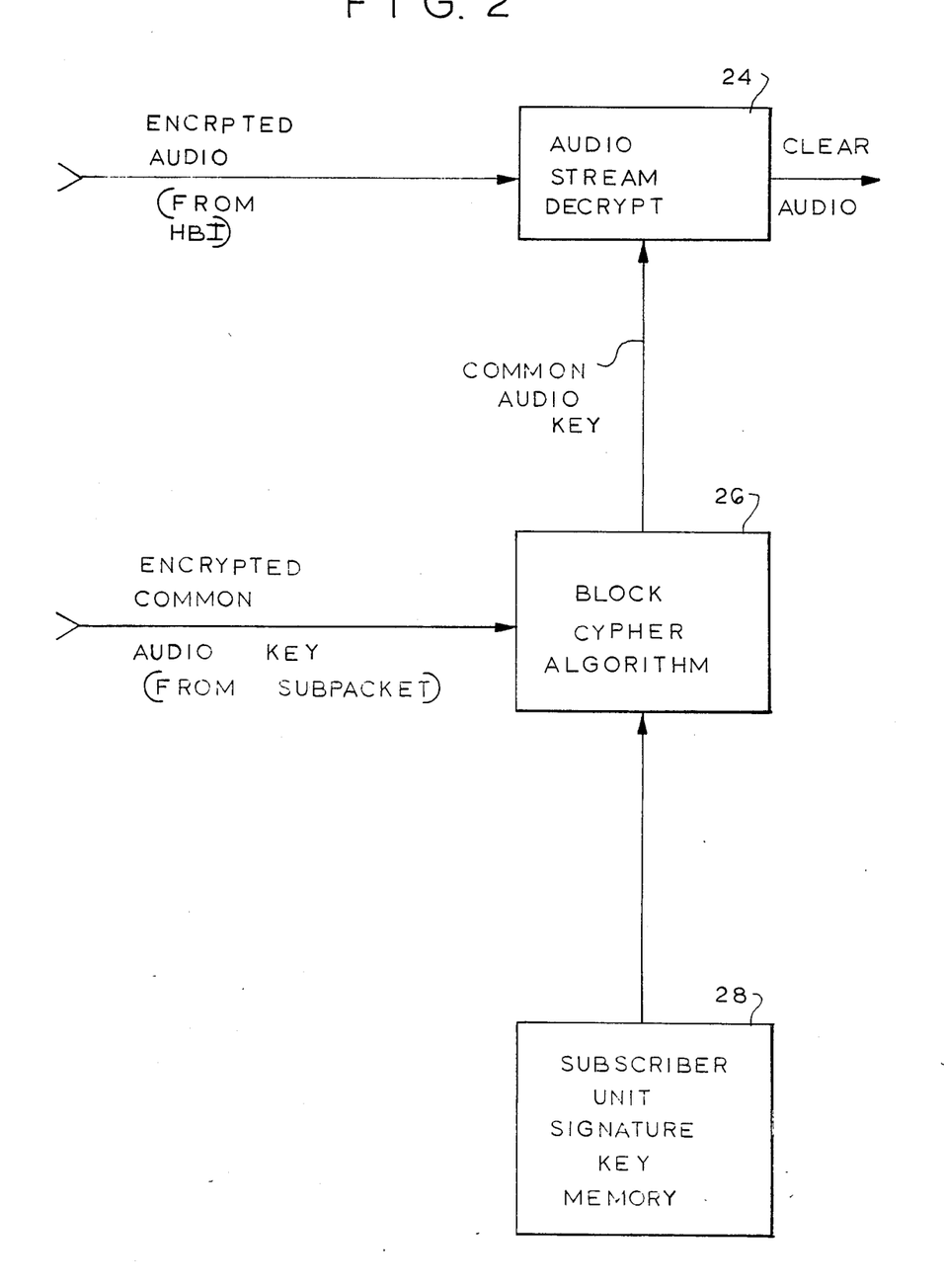
FIG. 2 is a schematic representation of the decryption system at each receiver terminal in the present invention.

As shown in FIG. 2, the transmitted encrypted audio signal is extracted from the data stream in the horizontal blanking intervals of the received composite television signal and forms an input to an audio stream decryption circuit 24. The encrypted audio signal will be decrypted using the common audio key. The common audio key is derived from the individualized encrypted common audio key which is transmitted to the receiver.

The receiver monitors the data stream in the horizontal blanking intervals until it detects the portion thereof with its unique address number. The individualized encrypted common audio key for the particular subscriber unit is then obtained from the addressed portion. The individualized encrypted common audio key is then decrypted in a block cipher algorithm circuit 26 and used to decrypt the encrypted audio signal, also transmitted in the data stream.

The subscriber unit signature key for the particular subscriber unit is utilized as the key for the block cipher algorithm circuit 26. The unique subscriber unit signature key for each subscriber unit is stored in a memory 28 within the unit. The unique subscriber unit signature key for the particular unit is stored in the unit memory in the factory.

Figure 3:
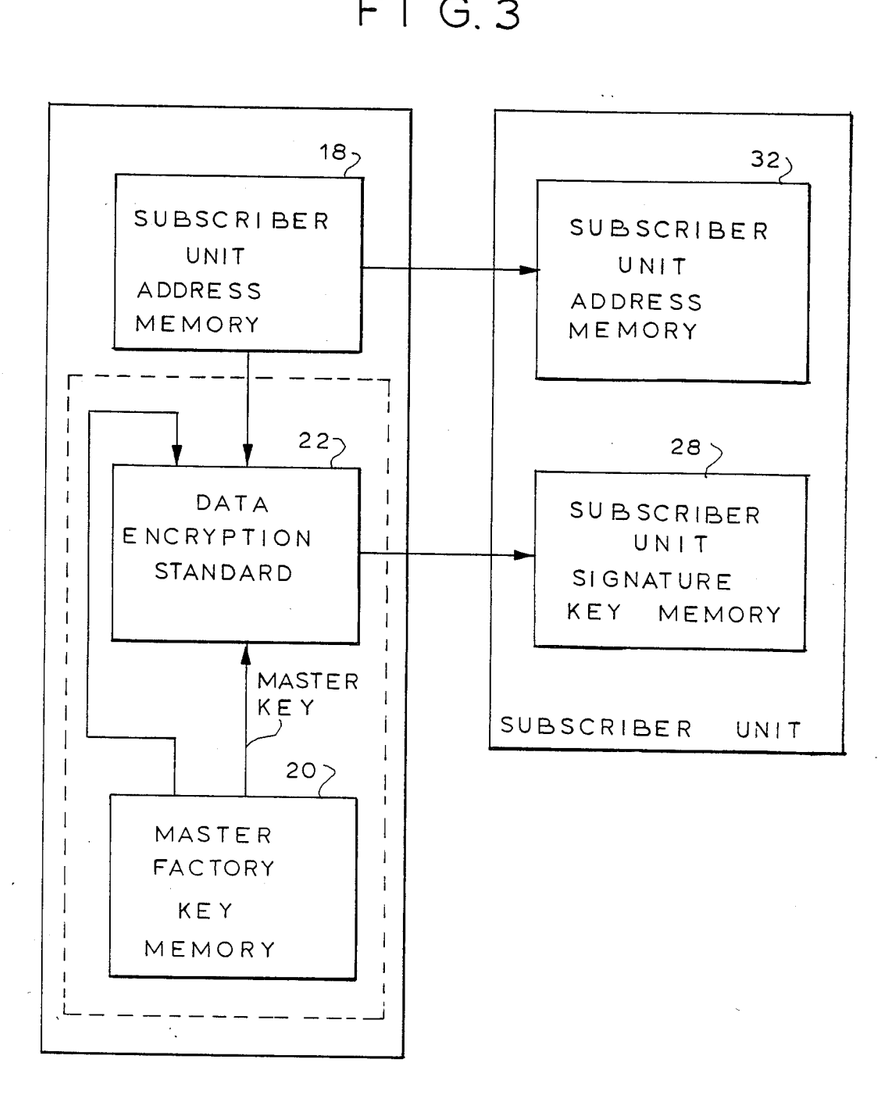
FIG. 3 is a schematic representation of the encoding system utilized at the factory in order to set the receiver terminal memories for decryption of the distributed signal.

FIG. 3 schematically depicts the factory encoding system. At the factory, the subscriber unit address is read from the subscriber unit address memory 18 and stored in the subscriber unit address memory 32 in the subscriber unit. The subscriber unit address is encrypted in the Data Encryption Standard algorithm circuit 22 using the master factory key from memory 20 and is then stored in the subscriber unit signature key memory 28 in the subscriber unit. Later, when signals are being transmitted, the master factory key from memory 20 is used in the Data Encryption Standard algorithm circuit 22 to generate the unique subscriber unit signature key for each subscriber unit, as described above.

FIG. 4 schematically represents the transmitted composite TV signal which comprises a plurality of active video portions, sync portions, and horizontal blanking portions. The data stream is inserted into consecutive horizontal blanking portions.

The data stream includes a run-in code for synchronization, an addressable data stream portion, the encrypted digitized audio signals, an audio code portion indicating whether the audio signals are stereo or bilingual, video inversion code, and spare bits.

The addressable data stream includes a header portion, containing information for addressing certain groups of subscribers and certain program related information common to all subscriber units in the addressed group. The addressable data stream also includes a plurality of addressed packets 1 ... n, each containing the address number for a different subscriber unit. Each addressed packet also contains the individualized common audio key for the addressed unit.

Each subscriber unit captures the encrypted audio information, finds a header with its group number, and then searches for the addressed packet with its address number. When the packet with its address number is located, the unit obtains the individualized common audio key therein and uses it, in conjunction with the unique subscriber unit signature key stored in the unit to decrypt the audio signals.

It will now be appreciated that the three key cryptographic system of the present invention permits the secure distribution of digitized signals to a large number of subscriber units without the necessity for storing a different key for each subscriber unit. Only a single master factory key must be protected in order to maintain the integrity of the entire system.

Moreover, there is nothing stored in any particular subscriber unit which, if obtained, would permit the cryptographic system to be broken. Even interception and analysis of all individualized encrypted common audio keys will not provide information concerning the master factory key. Further, periodically changing the common audio key further increases the security of the system.

While only a single preferred embodiment of the present invention has been disclosed herein for purposes of illustration, it is obvious that many variations and modifications could be made thereto. It is intended to cover all of these variations and modifications which fall within the scope of the present invention, as defined by the following claims.

I claim:

1. A cryptographic system for secure distribution of information from a transmission node to first and second receiver nodes, each of said receiver nodes having a unique address number, the system including real time control means comprising:
   means for generating a common key applicable to both of said receiver nodes;
   means for encrypting the information to be distributed using said common key;
   means for storing a list of address numbers associated with each of said receiver nodes;
   means for storing a master key, said master key being associated with both of said receiver nodes;
   means for selecting each receiver node in sequence;
   means for generating a different individual key for each of said selected receiver nodes, said individual key generating means comprising means for encrypting the address number for each of said receiver nodes using said master key;
   means for forming an individualized encrypted common key for each of said receiver nodes by encrypting the common key using the generated individual key for that receiver node;
   said individual key generating means being actuated in real time to generate an individual key for a given receiver node each time said given receiver node is selected, so as to eliminate the necessity for storing and securing a list of individual keys associated with each of said receiver nodes; and
   means for distributing said encrypted information to said receiver nodes and individualized encrypted common key for each receiver node to that receiver node.

2. The system of claim 1, wherein address number encrypting means comprises the Data Encryption Standard algorithm.

3. The system of claim 1, wherein said means for forming an individual encrypted common key for each receiver comprises a block cipher algorithm.

4. The system of claim 1, wherein said means for forming an individual encrypted common key for each receiver node comprises means for accessing said stored list of address number, means for selecting the address number from said stored list which is associates with the receiver for which the common key is being encrypted.

5. The system of claim 1, wherein said distributing means comprises means for generating a data stream, said data stream comprising said encrypted information and addressed portions, each of said addressed portions comprising the address number and individualized encrypted common key for an addressed receiver node.

6. The system of claim 5, wherein said information to be communicated comprises a digitized signal and is distributed by a composite television signal including video signal portions and horizontal blanking intervals and wherein said data stream is inserted into said horizontal blanking intervals.

7. The system of claim 1, wherein each receiver node has a unique individual key stored therein and further comprising means for receiving said encrypted information, means for receiving the individualized encrypted common key for that node, means for decrypting the received individualized encrypted common key using the stored individual key and means for decrypting said received encrypted information using said decrypted common key.

8. The system of claim 7, wherein said encrypted common key decrypting means comprises a block cipher algorithm.

9. The system of claim 1, further comprising means for periodically changing said common key.

10. The system of claim 1, wherein said information encrypting means comprises a stream cipher algorithm.

11. The system of claim 7, wherein information decrypting means comprises a stream cipher algorithm.

12. A three key cryptographic system for secure distribution of information from a transmission node to a plurality of receiver nodes wherein a first key is known only to the transmission node and is associated with more than one receiver node and each receiver node has a unique address number and a pre-stored second key, the transmission node comprising means for selecting each receiver node in sequence, means for generating the second key for each selected receiver node by encrypting the address number for the selected node with the first key, means for generating a third key, means for encrypting the information to be distributed with said third key, means for encrypting said third key for use by said selected receiver node with said generated second key, said means for generating the second key being actuated in real time to generate a second key for a selected receiver node each time said receiver node is selected, so as to eliminate the necessity for storing and securing the generated second key for each of said receiver nodes, means for distributing said encrypted information to all of said receiver nodes and said encrypted third key to said selected receiver node.

13. The system of claim 12, wherein each of said receiver nodes comprises means for receiving said encrypted information, means for receiving said encrypted third key for that receiver node, means for decrypting said receiver encrypted third key with the stored second key, and means for decrypting said receiver encrypted information with said received decrypted third key.

14. The system of claim 12, wherein said second key generating means comprises a Data Encryption Standard algorithm.

15. The system of claim 12, wherein said third key encrypting means comprises a block cipher algorithm.

16. The system of claim 13, wherein said third key decryption means comprises a block cipher algorithm.

17. The system of claim 12, wherein said third key generating means comprises means for periodically changing said third key.

18. The system of claim 12, wherein said information encryption means comprises a stream cipher algorithm.

19. The system of claim 13, wherein said information decrypting means comprises a stream cipher algorithm.

20. The system of claim 12, wherein the stored second key is unique for each receiver node.

21. The system of claim 12, wherein the stored second key for each receiver node is a function of the address number of that receiver node.

22. A three key cryptographic method for secure information distribution from a transmission node to a plurality of receiver nodes wherein a first key, associated with more than one of the receiver nodes, is known only to the transmission node and each receiver node has a unique address number and a pre-stored unique second key which is a function of its address number, the method comprising the steps of selecting each receiver node in turn, generating the second key for (a) each selected receiver node by encrypting the address number for the selected node with the first key, generating a third key, encrypting the information to be distributed with the third key, encrypting the third key with the generated second key, the second key for a selected receiver node being generated in real time each time the receiver node is selected, so as to eliminate the necessity of storing and securing the generated second key for each of the receiver nodes, distributing the encrypted information to all receiver nodes, distributing the encrypted third key to the selected receiver node; receiving the distributed encrypted information and the encrypted third key at the selected receiver node, and decrypting the received encrypted information using the received encrypted third key and the stored second key for the selected receiver node.

23. The method of claim 22, wherein the step of decrypting the received encrypted information comprises the steps of decrypting the encrypted third key using the stored second key for the selected receiver node and decrypting the encrypted information using the decrypted third key.

24. The method of claim 22, wherein the step of generating the second key comprises the step of encrypting the address number for the selected receiver node with the first key through the Data Encryption Standard algorithm.

25. The method of claim 22, wherein the step of encrypting the third key comprises encrypting the third key with the second key through a block cipher algorithm.

26. The method of claim 22, wherein the step of encrypting the information comprises the step of encrypting the information with said third key through a stream cipher algorithm.

27. The method of claim 23, wherein the step of decrypting the third key comprises the step of decrypting the third key using the stored second key for the selected receiver node through a block cipher algorithm.

28. The method of claim 23, wherein the step of decrypting the information comprises the step of decrypting the information with the decrypted third key through a stream cipher algorithm.

29. Apparatus for encrypting digitized signals in a direct boradcast satellite communications system including a transmission node and a plurality of receiver nodes, each receiver node having an address number and a pre-stored signature key which is a function of its address number, the apparatus comprising: means for generating a common key; means for encrypting the digitized signals with said common key; means for selecting each receiver node in turn, means for generating the signature key for each selected receiver node, said signature key generating means comprising: means for storing a master key associated with more than one of the receiver nodes and means for encrypting the address number of said selected receiver node associated with the master key using the master key, means for encrypting said common key for use by the selected receiver node using the generated signature key for that receiver node, said means for generating the signature key for a selected receiver node being actuated in real time to generate the signature key for said selected receiver node each time said receiver node is selected, so as to eliminate the necessity of storing and securing a signature key for each receiver node, means for distributing the encrypted digitized signals and the encrypted common key for said selected receiver node to said selected receiver node by means of a data stream comprising a first portion containing the encrypted digitized signals and receivable by all receiver nodes and a second portion comprising a plurality of sub-portions, each of said sub-portions comprising the encrypted common key for a different receiver node and receivable only by the receiver node having the address number upon which the encrypted common key therein is based.

30. A cryptographic method for secure distribution of information from a transmission node to first and second receiver nodes, each receiver node having a unique address number, the method comprising the steps of:

generating a common key;
encrypting the information to be distributed using said common key:
selecting each receiver node in sequence;
generating a different individual key for each receiver node in real time using a master key associated with both of the receiver nodes and encrypting the address number for each receiver node with the master key;
forming an individualized encrypted common key for each receiver node by encrypting the common key using the generated individual key for that receiver node; the individualized key for each receiver node being generated each time that node is selected, so as to eliminate the necessity for storing and securing an individual key for each receiver node; and
distributing the information to all receiver nodes and the individualized encrypted common key for each receiver node to that receiver node.

31. A method for encrypting digitized signals in a direct broadcast satellite communications system including a transmission node and a plurality of receiver nodes, each receiver node having an address number and a pre-stored signature key which is a function of its address number, the method comprising the steps of: storing a master key associated with more than one of the receiver nodes; generating a common key; encrypting the digitized signals with the common key; selecting each receiver node in turn; generating the signature key for a selected receiver node by encrypting the address number of the selected receiver node with the master key; encrypting said common key for use by the selected receiver node using the generated signature key for that receiver node; the signature key for each receiver node being generated in real time each time said receiver node is selected, so as to eliminate the necessity fo storing and securing the generated signature key for each of said receiver nodes, distributing the encrypted digitized signals and the encrypted common key for the selected receiver node to the selected receiver node by generating a data stream comprising a first portion containing the encrypted digitized signals, receivabe by all receiver noes and a second portion comprising a plurality of sub-portions, each of said sub-portions comprising the encrypted common key for a different receiver node and receivable only by the receiver node having the address number upon which the encrypted common key therein is based.

* * * * *

UNITED STATES PATENT AND TRADEMARK OFFICE
CERTIFICATE OF CORRECTION

PATENT NO. : 4,887,296

DATED : Dec. 12, 1989

INVENTOR(S) : Donald R. Horne

It is certified that error appears in the above-identified patent and that said Letters Patent is hereby corrected as shown below:

On the title page, item [73], should read --General Instrument Corporation, New York, N.Y.--; and insert --Attorney, Agent, or Firm—James & Franklin--.

Signed and Sealed this

Thirtieth Day of October, 1990

Attest:

HARRY F. MANBECK, JR.

Attesting Officer

Commissioner of Patents and Trademarks